(12) United States Patent
Liu et al.

(10) Patent No.: US 6,330,988 B1
(45) Date of Patent: Dec. 18, 2001

(54) SYSTEM FOR STAR CATALOG EQUALIZATION TO ENHANCE ATTITUDE DETERMINATION

(75) Inventors: Yong Liu, San Marino; Yeong-Wei Andy Wu, Rancho Palos Verdes; Rongsheng Li, Hacienda Heights, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/628,779

(22) Filed: Jul. 29, 2000

(51) Int. Cl.[7] .................................................. B64G 1/24
(52) U.S. Cl. .............................. 244/164; 244/171; 701/4; 701/222
(58) Field of Search .............................. 244/158 R, 164, 244/171; 701/222, 4

(56) References Cited

U.S. PATENT DOCUMENTS

| | | | |
|---|---|---|---|
| 3,713,740 | * | 1/1973 | Lillestrand et al. .................. 356/141 |
| 5,206,499 | * | 4/1993 | Mantravadi et al. ............. 250/203.6 |
| 5,745,869 | * | 4/1998 | van Bezooijen ..................... 701/222 |
| 5,935,195 | * | 8/1999 | Quine .................................. 701/222 |
| 6,227,496 | * | 5/2001 | Yoshikawa et al. ................. 244/171 |

* cited by examiner

Primary Examiner—J. Woodrow Eldred
(74) Attorney, Agent, or Firm—Terje Gudmestad

(57) ABSTRACT

An apparatus for star catalog equalization to enhance attitude determination includes a star tracker, a star catalog and a controller. The star tracker is used to sense the positions of stars and generate signals corresponding to the positions of the stars as seen in its field of view. The star catalog contains star location data that is stored using a primary and multiple secondary arrays sorted by both declination (DEC) and right ascension (RA), respectively. The star location data stored in the star catalog is predetermined by calculating a plurality of desired star locations, associating one of a plurality of stars with each of the plurality of desired star locations based upon a neighborhood association angle to generate an associated plurality of star locations: If an artificial star gap occurs during association, then the neighborhood association angle for reassociation is increased. The controller uses the star catalog to determine which stars to select to provide star measurement residuals for correcting gyroscope bias and spacecraft attitude.

21 Claims, 4 Drawing Sheets

SYSTEM FOR STAR CATALOG EQUALIZATION TO ENHANCE ATTITUDE DETERMINATION

STATEMENT OF GOVERNMENT INTEREST

Portions of the invention set forth herein were developed in the performance of work under NASA contract No. NAS5-98069 and are subject to the provisions of Section 305 of the National Aeronautics and Space act of 5 1958 (72 Stat. 435; 42 U.S.C. 2457). As a result, the United States of America as represented by its various departments and agencies may have certain rights in this patent.

TECHNICAL FIELD

The present invention relates generally to satellite attitude determination systems, and more particularly, to a system for star catalog equalization to enhance attitude determination performance.

BACKGROUND ART

Satellites and other spacecraft are in widespread use for various purposes including scientific research and communications. Many scientific and communications missions, however, cannot be accurately fulfilled without consistently monitoring and controlling the 3-axis attitude of the spacecraft. In many applications, the satellite must be positioned to direct communication signals in particular directions or to receive signals from specifically located sources. Without accurate control over spacecraft 3-axis attitude, the transmission of such signals is hindered and at times impossible.

Many modem spacecraft use star trackers for 3-axis attitude control. The systems for 3-axis attitude determination generally include one or more star trackers and a separate 3-axis orthogonal gyroscope. During normal operation, star trackers provide continuous attitude information and the 3-axis orthogonal gyroscope is needed to provide rate information and is constantly corrected by the star trackers.

To improve spacecraft attitude control performance, stellar inertial attitude determination algorithms employ a carefully designed star catalog. The current known art in star selection for star trackers mainly concentrates on generating star catalogs with certain properties. Typically, a star catalog is "equalized" by eliminating stars in the dense areas of the star catalog. The resulting star catalog becomes approximately uniformly distributed and is known to improve stellar inertial attitude determination performance.

Typically, computer memory and algorithm complexities (computer throughput) have always limited the size of on-board star catalog and prevented star catalog designs from using real-time star selection from an on-board star catalog for attitude determination purposes. Unfortunately, real-time star selection algorithms are complicated and have difficulty accommodating other star selection criteria.

The disadvantages associated with these conventional star catalog techniques have made it apparent that a new technique for star catalog equalization to enhance satellite attitude determination is needed. Preferably, the new technique would allow real time star selection while allowing the inclusion of other star selection techniques. Additionally, the new technique should improve stellar inertial attitude determination performance. The present invention is directed to these ends.

SUMMARY OF THE INVENTION

It is, therefore, an object of the invention to provide an improved and reliable system for star catalog equalization to enhance attitude determination. Another object of the invention is to provide a system that does not require large amounts of memory storage and throughput. Additionally, an object of the invention is to allow real time star selection while allowing the inclusion of other star selection techniques.

In accordance with the objects of this invention, a system for star catalog equalization to enhance attitude determination is provided. In one embodiment of the invention, an apparatus for star catalog equalization to enhance attitude determination includes a star tracker, a star catalog and a controller. The star tracker is used to sense the positions of stars and generate signals corresponding to the positions of the stars as seen in its field of view. The star catalog contains star location data that is stored using a primary and multiple secondary arrays sorted by both declination (DEC) and right ascension (RA), respectively. The star location data stored in the star catalog is predetermined by calculating a plurality of desired star locations, associating one of a plurality of stars with each of the plurality of desired star locations based upon a neighborhood association angle to generate an associated plurality of star locations. If an artificial star gap occurs during association, then the neighborhood association angle for reassociation is increased. The controller uses the star catalog to determine which stars to select to provide star measurement residuals for correcting gyroscope bias and spacecraft attitude.

The present invention achieves an improved system for star catalog equalization to enhance attitude determination. The present invention is advantageous in that it reduces required computer throughput and memory requirements while improving stellar inertial attitude determination performance.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
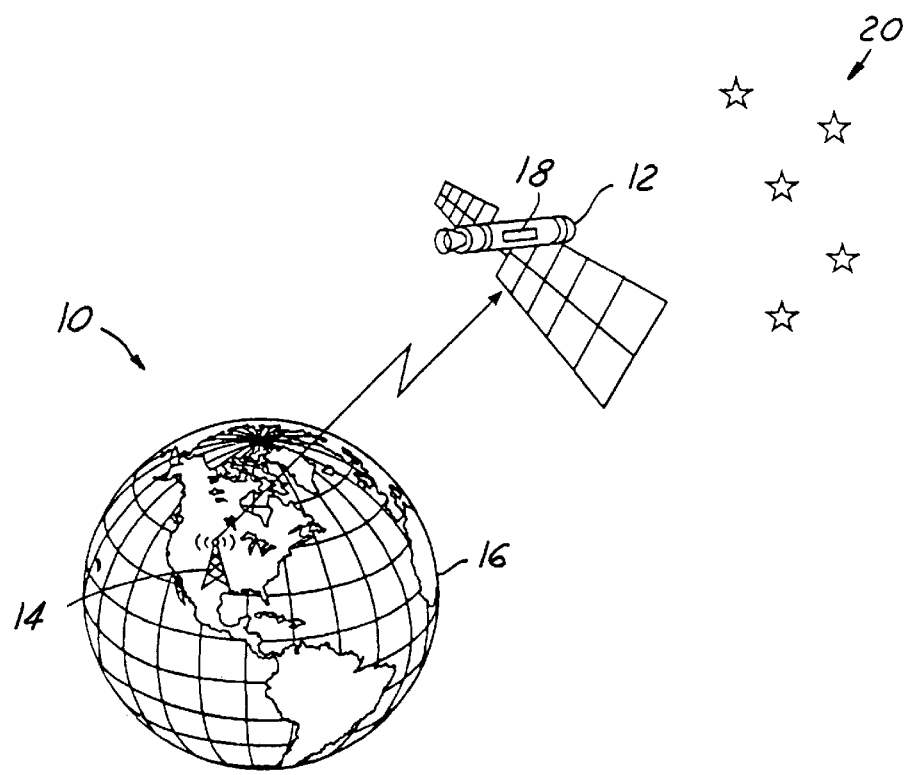
FIG. 1 is a perspective view of a satellite system for star catalog equalization to enhance attitude determination in accordance with a preferred embodiment of the present invention.

In the following figures, the same reference numerals will be used to identify identical components in the various views. The present invention is illustrated with respect to a system for star catalog equalization to enhance attitude determination, particularly suited for the aerospace field. However, the present invention is applicable to various other uses that may require star catalog equalization systems.

Referring to FIG. 1, a perspective view of a satellite system 10 for star catalog equalization to enhance attitude determination in accordance with one embodiment of the present invention is illustrated. The satellite system 10 is comprised of one or more satellites 12 in communication with a ground station 14 located on the Earth 16. Each satellite includes an apparatus 18 for determining stellar inertial attitude based upon a plurality of stars 20.

The satellite system 10 is responsible for generating a star catalog with certain star patterns to improve spacecraft attitude determination performance with either single tracker based or multi-tracker based stellar inertial attitude determination (SIAD) systems. By bringing in various design criteria into the star catalog, the real-time star tracker command logic can be simplified that save both on-board flight computer throughput and memory. Depending on the design objective and the characteristics of the noises and errors existing in a particular star tracker, the selection criteria can be adjusted independent of the flight software. One particular star pattern criterion is to maximize the geometric separation of the stars within a star tracker's FOV while keeping as many stars as what the trackers' capability allows. This is equivalent to having evenly distributed stars in the catalog with the total number of stars determined by the trackers' capability. This invention applies the equalized catalog to improve SIAD performance by having better noise and error attenuation.

Figure 2:
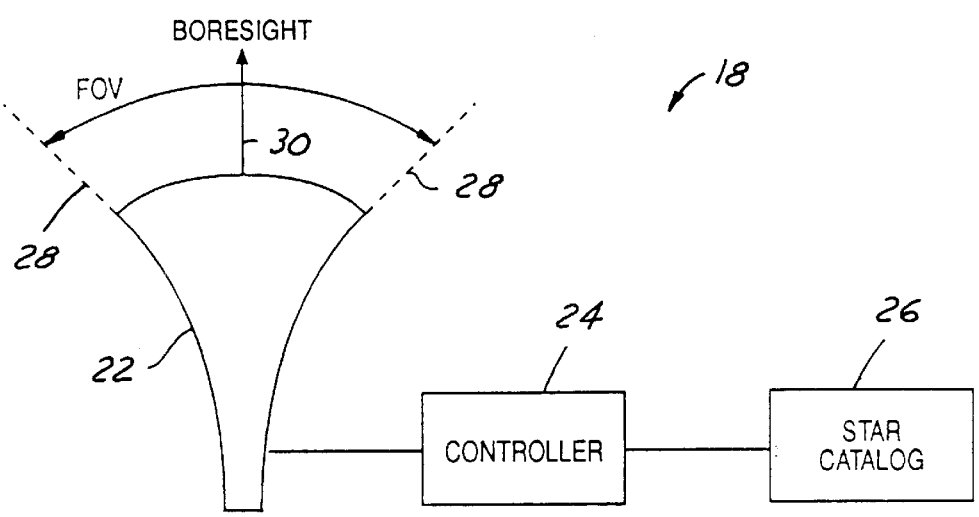
FIG. 2 is a block diagram of an apparatus for star catalog equalization to enhance attitude determination in accordance with a preferred embodiment of the present invention.

Referring to FIG. 2, a block diagram of an apparatus 18 for star catalog equalization to enhance attitude determination in accordance with one embodiment of the present invention is illustrated. Apparatus 18 includes a star tracker 22 and a controller 24. Apparatus 18 also includes a star catalog 26.

Star tracker 22 is mounted to the satellite 12 and is coupled to star tracker controller 24 in a conventional manner. Star tracker 22 includes a field of view (FOV) 28 and a boresight 30 centered in the FOV 28. Star tracker 22 is used to sense a plurality of positions of a plurality of stars 20 relative to star tracker 22. Star tracker 22 then generates a plurality of signals corresponding to the plurality of star positions in the FOV 28.

Star tracker controller 24 may reside either in satellite 12 or with ground station 14. Controller 24 is coupled to star tracker 22 and receives the plurality of signals corresponding to the plurality of star positions in the FOV 28. Star tracker controller 24 provides control logic operative to select at least two of the plurality of signals corresponding to the positions of at least two stars. Controller 24 uses star catalog 26 to determine which stars 20 to select to provide star measurement residuals for correcting gyroscope bias and spacecraft attitude. Controller 24 is preferably microprocessor based.

Star catalog 26 consists of a plurality of star right ascension and declination angles in a given earth centered inertial (ECI) frame, star instrument magnitude, and other star properties. Star catalog 26 contains data that is stored using primary and multiple secondary arrays sorted by both declination (DEC) and right ascension (RA). The primary array contains a list that represents declination angles ranging from negative ninety to positive ninety degrees, with a resolution of a declination step size. The ideal declination step size will vary depending on controller 24 throughput, tracker FOV 28 size and star catalog 26 size. It is also possible to use variable declination step sizes so that all secondary arrays are the same length. In the present preferred embodiments, the declination step size is defined to be one degree.

Each primary array element points to separate secondary arrays, which contain star data (i.e. magnitude, star vector, and identification number) for all stars 20 that are between the current and the primary array next element. All the stars 20 in these secondary arrays are sorted by their right ascension from zero to 360 degrees.

In the present invention, the star equalization algorithm relies on a set of the grid points that are uniformly distributed on a unit sphere. There are many ways to generate such a set. As an example, one embodiment of the present invention employs a so-called "spherical spiral points" generated using a set of equations. This is one approach for generating almost equally distributed points on a sphere by following a spherical spiral. Let n be the desired total number of points. Set $L_n = \sqrt{n\pi}$. For k=0, n-1, calculate the unit vector component of all the points in a Cartesian frame as follows:

$$z_k = 1 - \frac{(2k-1)}{n} \quad (1)$$

$$\phi_k = \arccos(z_k)$$

$$\theta_k = L_n \phi_k$$

$$x_k = \sin(\phi_k)\cos(\theta_k)$$

$$y_k = \sin(\phi_k)\sin(\theta_k)$$

$$p_k = (x_k, y_k, z_k)$$

Note that the total number of points uniquely determines the unit vectors of all data points.

Figure 3A:
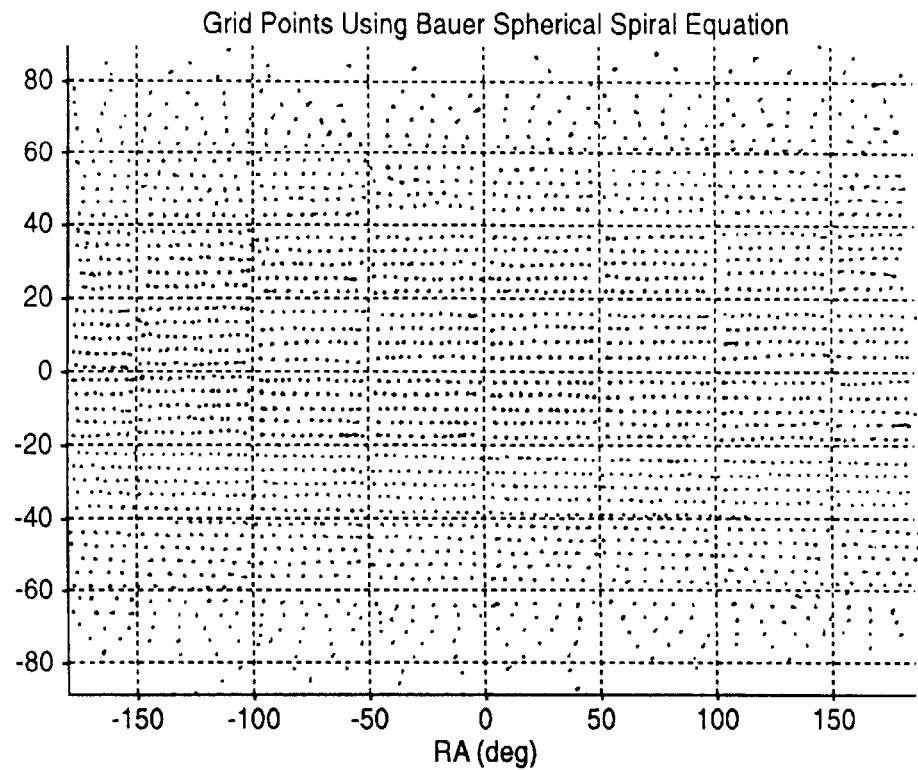
FIGS. 3A and 3B are plots of the ideal star locations in planar and three dimensional coordinates, respectively, in accordance with a preferred embodiment of the present invention.
Figure 3B:
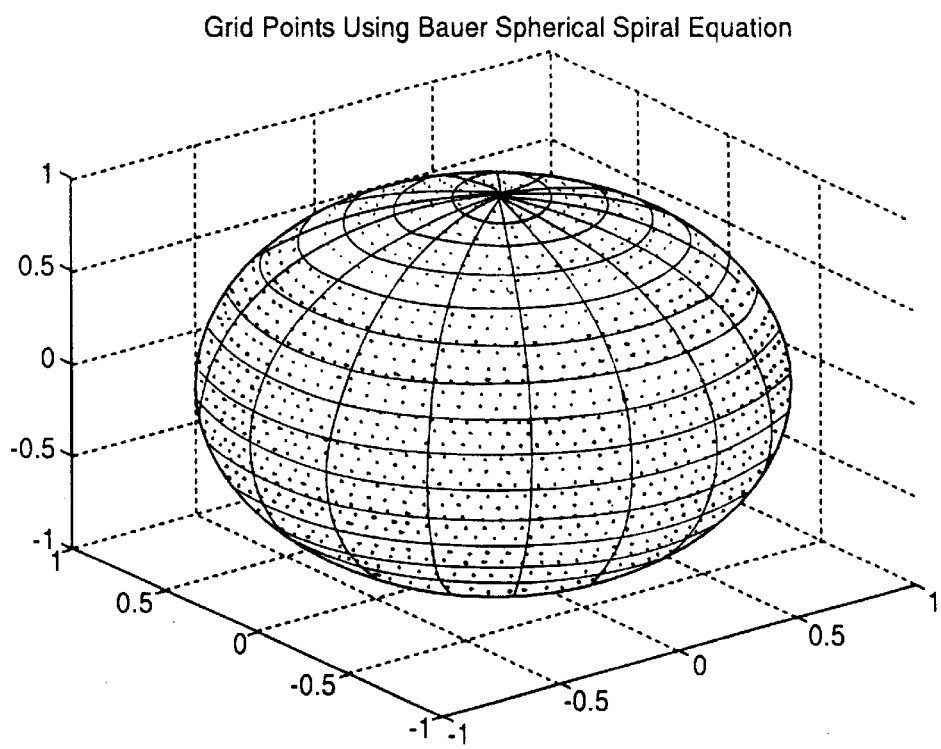

Referring to FIGS. 3A and 3B, plots of the calculated ideal star locations in planar and three dimensional coordinates, respectively, in accordance with a preferred embodiment of the present invention are illustrated. Assuming that the star tracker 22 is capable of simultaneously tracking m stars 20. It is desirable to have n stars 20 equally distributed in the tracker's FOV 28 for SIAD performance improvement. If the tracker 22 has a square shaped FOV 28 of size a×a (a in degrees), the desired total star 20 numbers in the full sky is calculated as follows:

$$N_{star} = \frac{S_{SKY}}{S_{FOV}} \times n = \frac{4\pi}{\left(a \times \frac{\pi}{180}\right)^2} \times n \quad (2)$$

For n=5 and a=8 degrees, the total number of stars is 3222. Substituting Eq. (2) into Eq. (1) the unit vectors for the desired star locations may be calculated.

In the present invention, the star catalog 26 used for catalog equalization for GOES is produced from NASA's SKY2000 v.2 catalog by applying various tracker related star selection criteria. It has a total of 6858 stars with highly uneven distribution. With a "grid point association" equalization approach, the algorithm tries to "associate" a star 20 within the neighborhood of a given grid point to the grid point. First, a star's line-of-sight (LOS) unit vector in the ECI frame is calculated from its right ascension and declination angles:

$$X_{star}=\cos(DE)\cos(RA)$$

$$Y_{star}=\cos(DE)\sin(RA) \quad (3)$$

$$Z_{star}=\sin(DE)$$

For each grid point, a small neighborhood is defined as follows:

$$S_{NEIGHBOR}(\text{grid}_i)=\{\text{unitvec}(k): <\text{unitvec}(i),\text{unitvec}(k)> \geq \cos(\theta_{SEP})\}$$

where "<*,*>" denotes inner product, unitvec(j) is the unit vector of grid$_j$, and θSEP is a pre-defined separation angle. Since the average star separation angle with ideally distributed stars in an FOV 28 is $\sqrt{S_{FOV}/5}=0.0624$ (rad), this number is used as the unit separation angle. In general, the smaller the separation angle, the better star distribution the equalized catalog will have. However, a separation angle too small may not have any eligible stars to choose from. Failing to find an association then creates an artificial star gap in the equalized catalog. To solve this problem, the "association" algorithm can run through all the grid points multiple times and at each time a new neighborhood with an increased size is used.

Figure 4:
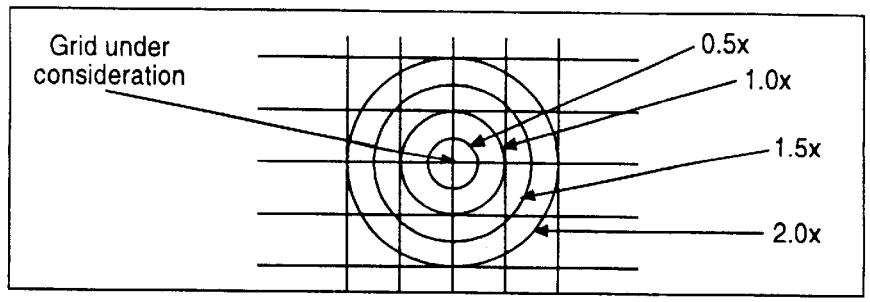
FIG. 4 is a depiction of a grid point association algorithm for star catalog equalization to enhance attitude determination in accordance with a preferred embodiment of the present invention.

Referring to FIG. 4, a depiction of a grid point association algorithm for star catalog equalization to enhance attitude determination in accordance with a preferred embodiment of the present invention is illustrated. In one embodiment of the present invention, four neighborhoods of different sizes for each grid point may be used. The grid point association algorithm for star selection with multiple neighborhoods of increased sizes works as follows: It searches through all the grid points and assigns a star that is optimal against a set of criteria to the grid point. The grid point is marked if an association is successful. The same search is repeated with an increased neighborhood size and a set of (possibly different) optimal star selection criteria until the neighborhood size is reaching certain level.

Figure 5:
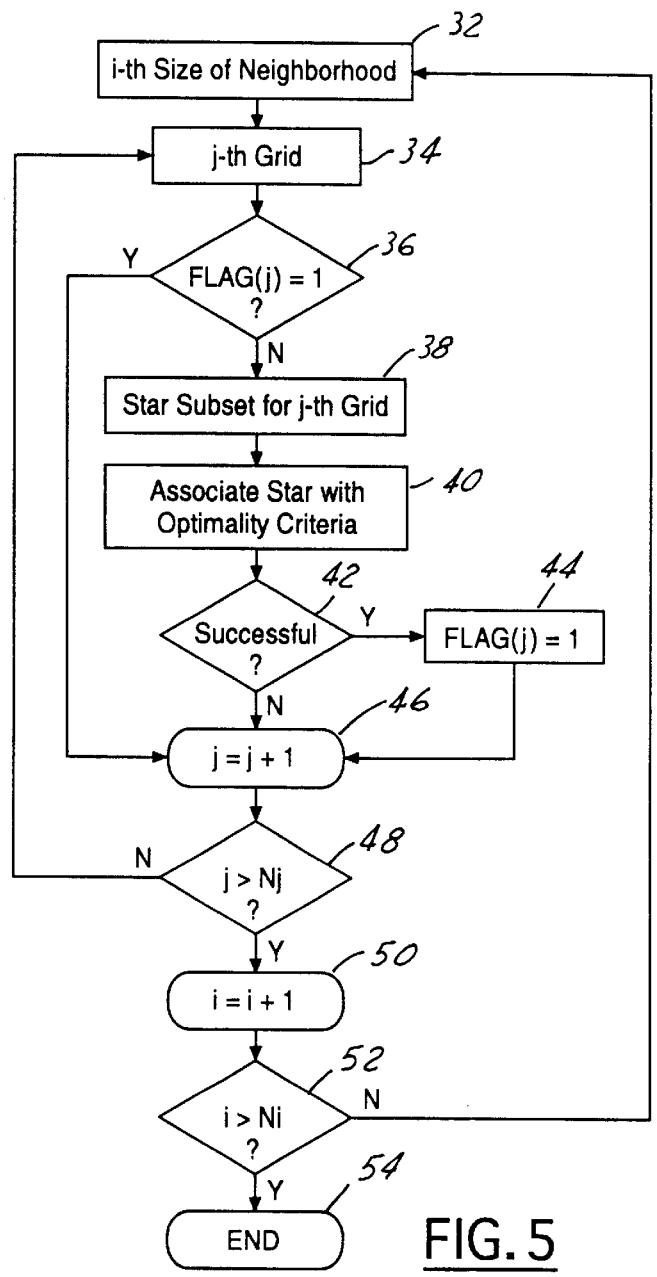
FIG. 5 is a flow chart of a method for star catalog equalization to enhance attitude determination in accordance with a preferred embodiment of the present invention.

Referring to FIG. 5, a flow chart of a method for star catalog equalization to enhance attitude determination in accordance with a preferred embodiment of the present invention is illustrated. In operation, the method begins with step 32 where the size of the neighborhood i is determined. Once this determination is made the sequence proceeds to step 34 where the size of the grid j is determined. The sequence then proceeds to step 36.

In step 36, if j equals one then the sequence proceeds to step 46, if j does not equal one the sequence proceeds to step 38. In step 38 the method determines the star subset for the j-th grid. The sequence then proceeds to step 40 where the star is associated with optimality criteria. If this comparison is successful in step 42, then j is set to one in step 44, otherwise the sequence proceeds to step 46 where j is incremented by one. The sequence then proceeds to step 48.

In step 48, j is compared to Nj. If j is greater than Nj then the sequence proceeds to step 50, otherwise, when j is less than Nj the sequence returns to step 34. In step 50, i is incremented by one and the sequence proceeds to step 52. In step 52, i is compared to Ni. If i is greater than Ni then the sequence ends with step 54, otherwise, when i is less than Ni the sequence returns to step 32.

Figure 6A:
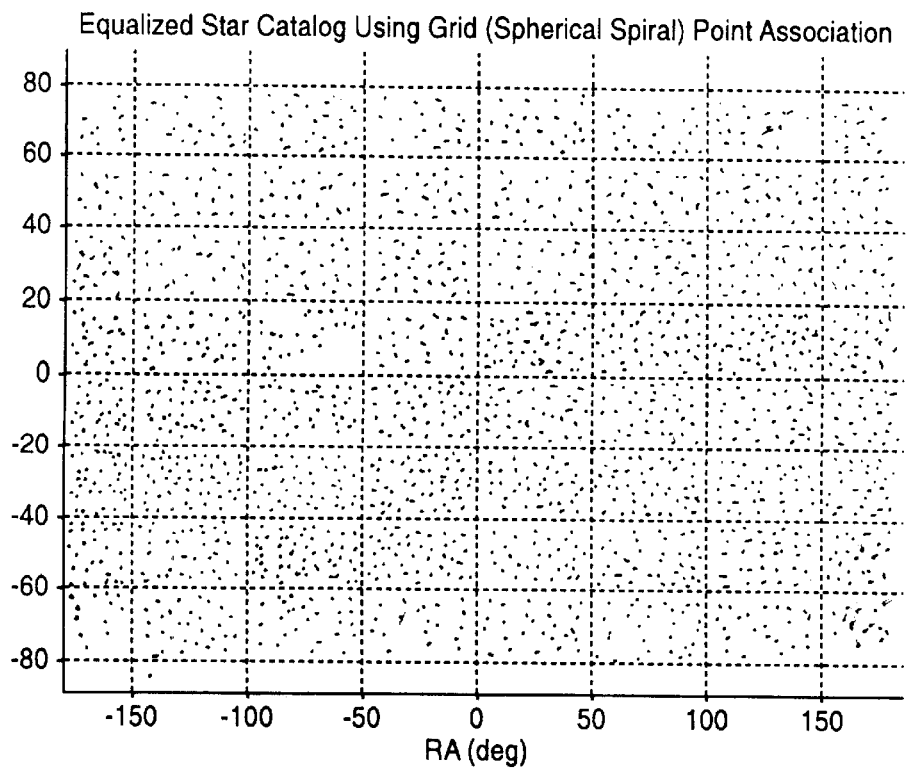
FIGS. 6A and 6B are plots of the equalized star catalog in planar and three dimensional coordinates, respectively, in accordance with a preferred embodiment of the present invention.
Figure 6B:
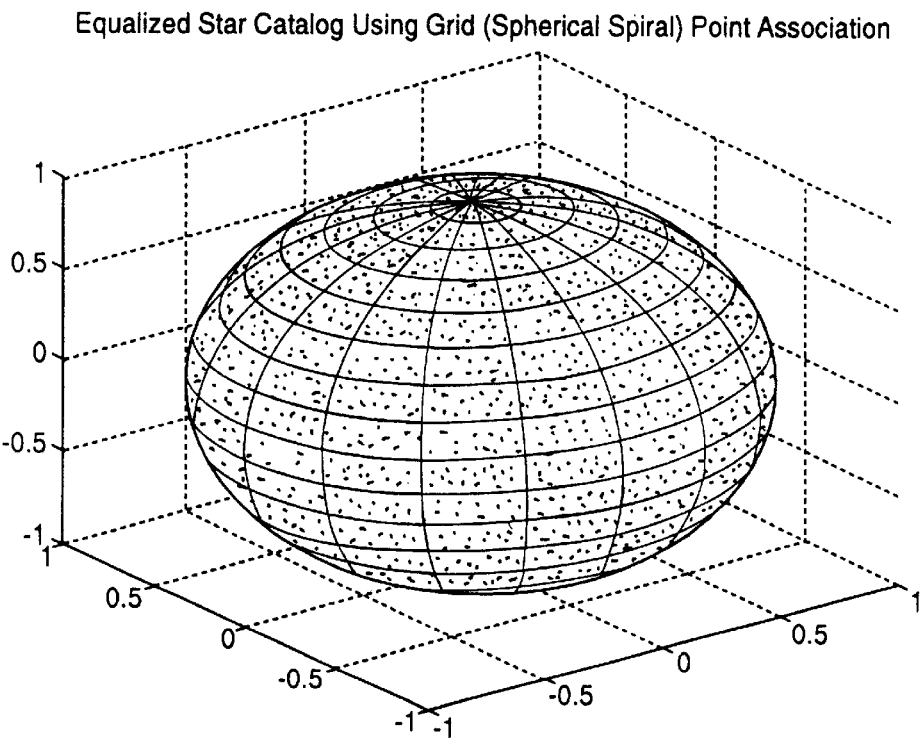

Referring to FIGS. 6A and 6B, plots of the equalized star catalog in planar and three dimensional coordinates, respectively, in accordance with a preferred embodiment of the present invention are illustrated. One example of the optimality criteria is the shortest angular distance to the grid point with star magnitude brighter than certain level. Mathematically, these criteria are equivalent to $$\text{star}_i^{pick}=\{\text{star}_k \in S_{NEIGHBOR}(\text{grid}_i):\text{dist}(\text{star}_k,\text{grid}_i)=\min(\text{dist}(\text{star}_k,\text{grid}_i))\} \quad (5)$$

$$\text{mag}_i(\text{star}_i^{pick}) \leq \text{mag}_{LIMIT} \quad (6)$$

The distance between two unit vectors is again defined as the separation angle between the two unit vectors and is easily calculated via inner product. Other criteria concerning the quality of a star, such as the star magnitude uncertainty and star position uncertainty may be used. The present invention star catalog generated using the algorithm described above with 4-size of neighborhoods and Eqs. (5)–(6) consists of 3222 stars.

The present invention thus achieves an improved and reliable system for star catalog equalization to enhance attitude determination by using a grid point association approach. The present invention improves over the prior art by varying the size of the "association" neighborhood in the simple equalization algorithm, which allows various levels of the uniformity of star distribution to be achieved. Additionally, by incorporating different star selection criteria at different "association" steps, weightings can be used, with a defined star quality ranking system, in selecting high-quality stars first and low quality stars to just fill star gaps. Also, by using a predetermined equalized star catalog, the on-board star catalog size can be reduced and the on-board star tracker command logic can be simplified. This saves memory and increase efficiency. By commanding star tracker to track catalog stars that are almost uniformly distributed in the tracker FOV and therefore are maximally geometrically separated, the minimum geometry dilution can be achieved and consequently better SIAD performance can be achieved. By commanding star tracker to track catalog stars that are almost uniformly distributed in the tracker FOV, the tracker low-spatial frequency errors are likely to be better attenuated due to averaging effect and consequently better SLAD performance can be achieved. By commanding star tracker to track catalog stars that are almost uniformly distributed in the tracker FOV, a relatively invariant "center of stars" in the tracker FOV can be achieved. In a multi-tracker based SIAD system, the tracker bias (misalignment) and measurement noise induced "thrashing" effects can be minimized if the "center of stars" variation between two trackers are minimized.

From the foregoing, it can be seen that there has been brought to the art a new and improved system for determining stars within or near a star tracker field of view. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An apparatus for star catalog equalization to enhance attitude determination comprising:
   a star tracker for sensing a plurality of positions of a plurality of stars relative to said star tracker, said star tracker having a field of view and generating a plurality of signals corresponding to said plurality of positions in said field of view;
   a star catalog comprising a primary array having a plurality of steps with a resolution of a declination step size, each step corresponding to a secondary array containing a plurality of declination angles and right ascension angles corresponding to a plurality of positions said plurality of stars; and a controller coupled to said star catalog and said star tracker, said controller having control logic operative to calculate a plurality of desired star locations, associate one of said plurality of stars with each of said plurality of desired star locations to generate an associated plurality of stars, and create an equalized star catalog based on said associated plurality of stars.

2. The apparatus for star catalog equalization to enhance attitude determination as recited in claim 1, wherein said field of view is a shaped field of view.

3. The apparatus for star catalog equalization to enhance attitude determination as recited in claim 2, wherein said field of view is a square field of view.

4. The apparatus for star catalog equalization to enhance attitude determination as recited in claim 1, wherein said star catalog includes an association of one of said plurality of stars with each of said plurality of desired star locations to generate an associated plurality of stars based on a separation angle.

5. The apparatus for star catalog equalization to enhance attitude determination as recited in claim 4, wherein said separation angle is $\sqrt{S_{FOV}}/5$.

6. The apparatus for star catalog equalization to enhance attitude determination as recited in claim 5, wherein said star catalog includes star positions generated by checking each of said desired star locations multiple times.

7. The apparatus for star catalog equalization to enhance attitude determination as recited in claim 6, wherein said star controller includes an association of said plurality of stars using a neighborhood association.

8. The apparatus for star catalog equalization to enhance attitude determination as recited in claim 7, wherein said neighborhood association increases in size with each check.

9. The apparatus for star catalog equalization to enhance attitude determination as recited in claim 1, wherein said apparatus is used by one of the applications selected from the group consisting of, star identification, direct field of view operation, and simulation.

10. A satellite system comprising:

a ground station;

a satellite in orbit and in communication with said ground station, said satellite having an apparatus for star catalog equalization to enhance attitude determination comprising:

a star tracker for sensing a plurality of positions of a plurality of stars relative to said star tracker, said star tracker having a field of view and generating a plurality of signals corresponding to said plurality of positions in said field of view;

a star catalog comprising a primary array having a plurality of steps with a resolution of a declination step size, each step corresponding to a secondary array containing a plurality of declination angles and right ascension angles corresponding to a plurality of positions said plurality of stars; and a controller coupled to said star catalog and said star tracker, said controller having control logic operative to calculate a plurality of desired star locations, associate one of said plurality of stars with each of said plurality of desired star locations to generate an associated plurality of stars, and create an equalized star catalog based on said associated plurality of stars.

11. The satellite system for star catalog equalization to enhance attitude determination as recited in claim 10, wherein said field of view is a shaped field of view.

12. The satellite system for star catalog equalization to enhance attitude determination as recited in claim 11, wherein said field of view is a square field of view.

13. The satellite system for star catalog equalization to enhance attitude determination as recited in claim 10, wherein said star catalog includes an association of one of said plurality of stars with each of said plurality of desired star locations to generate an associated plurality of stars based on a separation angle.

14. The satellite system for star catalog equalization to enhance attitude determination as recited in claim 13, wherein said separation angle is $\sqrt{S_{FOV}}/5$.

15. The satellite system for star catalog equalization to enhance attitude determination as recited in claim 14, wherein said star catalog includes star positions generated by checking each of said desired star locations multiple times.

16. The satellite system for star catalog equalization to enhance attitude determination as recited in claim 15, wherein said star controller includes an association of said plurality of stars using a neighborhood association.

17. The satellite system for star catalog equalization to enhance attitude determination as recited in claim 16, wherein said neighborhood association increases in size with each check.

18. The satellite system for star catalog equalization to enhance attitude determination as recited in claim 10, wherein said apparatus is used by one of the applications selected from the group consisting of, star identification, direct field of view operation, and simulation.

19. A method of star catalog equalization to enhance attitude determination comprising the steps of:

providing a star tracker sensing a plurality of position of a plurality of stars relative to said star tracker;

calculating a plurality of desired star locations;

associating one of said plurality of stars with each of said plurality of desired star locations based upon a predetermined angle to generate an associated plurality of stars; and creating an equalized star catalog based on said associated plurality of stars.

20. The method of star catalog equalization to enhance attitude determination as recited in claim 19, further comprising the step of repeating the association of one of said plurality of stars with each of said plurality of desired star locations when an artificial star gap occurs based upon a predetermined neighborhood angle to generate an associated plurality of stars.

21. The method of star catalog equalization to enhance attitude determination as recited in claim 20, further comprising the step of increasing said predetermined neighborhood angle for each association when artificial star gap occurs.

* * * * *